US009346461B2

(12) United States Patent
Saito

(10) Patent No.: US 9,346,461 B2
(45) Date of Patent: May 24, 2016

(54) CONTROL DEVICE FOR DETERMINING VEHICLE SPEED FOR SWITCHING FROM SERIES MODE TO PARALLEL MODE

(75) Inventor: Jun Saito, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 14/241,692

(22) PCT Filed: Aug. 7, 2012

(86) PCT No.: PCT/JP2012/070055
§ 371 (c)(1),
(2), (4) Date: Feb. 27, 2014

(87) PCT Pub. No.: WO2013/031491
PCT Pub. Date: Mar. 7, 2013

(65) Prior Publication Data
US 2014/0195092 A1 Jul. 10, 2014

(30) Foreign Application Priority Data

Sep. 1, 2011 (JP) .................................. 2011-190667

(51) Int. Cl.
*B60W 20/00* (2006.01)
*B60W 10/02* (2006.01)
*B60W 10/06* (2006.01)
(Continued)

(52) U.S. Cl.
CPC ................ *B60W 20/20* (2013.01); *B60K 6/442* (2013.01); *B60L 11/123* (2013.01); *B60W 10/06* (2013.01);
(Continued)

(58) Field of Classification Search
CPC ... B60W 20/20; B60W 50/082; B60W 20/00; B60W 10/06; B60W 2540/04; B60W 2520/10; B60W 10/05; B60K 6/442; B60L 11/123; Y02T 10/6234; Y02T 10/6217; Y02T 10/7077; Y02T 10/7005; Y02T 10/6286; Y10S 903/946
See application file for complete search history.

(56) References Cited

U.S. PATENT DOCUMENTS 6,059,059 A * 5/2000 Schmidt-Brucken ...... 180/65.23
7,497,285 B1 * 3/2009 Radev ....................... 180/65.225
(Continued)

FOREIGN PATENT DOCUMENTS

JP         10-259746 A    9/1998
JP         1-275710 A    10/1999
(Continued)

OTHER PUBLICATIONS

JP2011-1 56985-translate.pdf . English translation of JP 2011-156985 obtained from ESPACENET on May 13, 2015.*

Primary Examiner — Rami Khatib
Assistant Examiner — Jeffrey Boomer
(74) Attorney, Agent, or Firm — Birch, Stewart, Kolasch & Birch, LLP

(57) ABSTRACT

A switching vehicle speed determination section (21) judges a traveling mode requested by a driver on the basis of switch position information of a traveling mode switch operated by the driver and determines a switching vehicle speed for switching a hybrid type from a series mode to a parallel mode. A series/parallel modes switching determination section (22) determines switching between the series mode and the parallel mode on the basis of the switching vehicle speed set for the traveling mode determined by the switching vehicle speed determination section (21) and a vehicle speed detected by a vehicle speed sensor. A clutch control section (23) controls engagement/disengagement of a clutch on the basis of a determination result of the series/parallel modes switching determination section (22).

2 Claims, 4 Drawing Sheets

(51) Int. Cl.
- *B60W 50/08* (2012.01)
- *B60L 11/12* (2006.01)
- *B60W 10/08* (2006.01)
- *B60K 6/442* (2007.10)

(52) U.S. Cl.
CPC ............... *B60W 10/08* (2013.01); *B60W 20/00* (2013.01); *B60W 50/082* (2013.01); *B60W 10/02* (2013.01); *B60W 2520/10* (2013.01); *B60W 2540/04* (2013.01); *Y02T 10/6217* (2013.01); *Y02T 10/6234* (2013.01); *Y02T 10/6286* (2013.01); *Y02T 10/7005* (2013.01); *Y02T 10/7077* (2013.01); *Y10S 903/946* (2013.01)

(56) References Cited

U.S. PATENT DOCUMENTS

| | | | |
|---|---|---|---|
| 2011/0094806 A1* | 4/2011 | Mack et al. ................. | 180/65.6 |
| 2011/0098152 A1* | 4/2011 | Sah ........................ | B60K 6/365 477/86 |
| 2012/0208671 A1* | 8/2012 | Zhu ........................ | B60K 6/387 477/5 |
| 2013/0218394 A1* | 8/2013 | Kanayama et al. ............. | 701/22 |
| 2013/0226387 A1* | 8/2013 | Hayashi .................. | B60K 6/442 701/22 |
| 2013/0253743 A1* | 9/2013 | Maruyama ............. | B60K 6/445 701/22 |
| 2014/0051538 A1* | 2/2014 | Wenthen et al. .............. | 475/150 |
| 2014/0077941 A1* | 3/2014 | Yamamura ............ | B60W 20/00 340/438 |
| 2014/0229043 A1* | 8/2014 | Frank .................... | B60W 20/20 701/22 |

FOREIGN PATENT DOCUMENTS

| | | |
|---|---|---|
| JP | 2003-237392 A | 8/2003 |
| JP | 2011-156985 A | 8/2011 |

* cited by examiner

CONTROL DEVICE FOR DETERMINING VEHICLE SPEED FOR SWITCHING FROM SERIES MODE TO PARALLEL MODE

TECHNICAL FIELD

The present invention relates to a control device for a hybrid vehicle, and more particularly to operation control of a clutch which transmits power of an internal combustion engine.

BACKGROUND ART

In recent years, a hybrid vehicle having both an internal combustion engine and an electric motor as a power source has been developed. In general, there are two types of hybrid modes for a hybrid vehicle, i.e. a series mode and a parallel mode. In the series mode, a power generator is driven by power of the internal combustion engine, and an electric motor coupled with a drive axle is driven by the power obtained by the power generator, whereby the vehicle is made to travel. In the parallel mode, the drive axle is driven by the power of the internal combustion engine, the electric motor coupled with the drive axle is driven by the power obtained by a battery, and the vehicle is made to travel by using either one or both of the power of the internal combustion engine and the power of the electric motor in accordance with an operation state of the vehicle.

In the series mode as described above, the internal combustion engine is used only for driving of the power generator. Since the internal combustion engine can be operated in the most efficient operation condition of the internal combustion engine regardless of an operation state of a vehicle, fuel efficiency can be improved. In the parallel mode, the drive axle is driven by power outputted from the internal combustion engine and the power of the internal combustion engine is not converted to electric power in the power generator and there is no loss caused by conversion to electric power in the power generator, and thus, fuel efficiency can be further improved than the series mode.

However, in the series mode, the power is generated only by the electric motor, and it is known that an output torque decreases on a high rotation speed region due to characteristics of the electric motor.

In view of the above, a technology for ensuring a power performance is developed without deteriorating fuel efficiency of a vehicle by using the series mode in which travel is powered only by the electric motor at a low vehicle speed of the vehicle and by using the parallel mode in which travel is powered by the internal combustion engine and the electric motor when the vehicle speed rises (see Patent Literature 1).

CITATION LIST

Patent Literature

[Patent Literature 1] Japanese Laid-Open Patent Application No. 2003-237392

SUMMARY OF INVENTION

Technical Problem

In a hybrid vehicle in the above described Patent Literature 1, the series mode and the parallel mode are switched at a vehicle speed at which it is determined in a comprehensive manner that both fuel efficiency and output torque are balanced.

However, if the series mode and the parallel mode are switched at a vehicle speed at which the fuel efficiency and the output power are balanced as in Patent Literature 1, if a driver requests a large torque during travel at a vehicle speed faster than the vehicle speed at which the mode is changed, a problem arises that the vehicle may not be able to generate a maximum torque that can be generated as a vehicle.

If a maximum torque generation according to the driver requests as above is not possible, the motion performance of the vehicle deteriorate, which is not preferable.

The present invention has been deviced in order to solve such problems and has an object to provide a control device for a hybrid vehicle which allows supplying a maximum torque of a vehicle and can improve the motion performance of the vehicle.

Solution to Problem

In order to achieve the object, a control device for a hybrid vehicle of the present invention is provided with an internal combustion engine and an electric motor mounted on a vehicle, a drive wheel driven by at least either one of the internal combustion engine and the electric motor, a power generator for generating electric power by being driven by the internal combustion engine, a secondary battery for storing electric power generated by the power generator and supplying the stored electric power to the electric motor, a clutch interposed between the internal combustion engine and the drive wheel and adapted to engage/disengage power transmitted from the internal combustion engine to the drive wheel, and a mode switching control unit for switching between a series mode in which the drive wheel is driven by power generated by the electric motor by using the electric power supplied from the secondary battery or the power generator by disengaging the clutch and a parallel mode in which the drive wheel is driven by power of the internal combustion engine and the power generated by the electric motor by using the electric power supplied from the secondary battery by engaging the clutch, and the mode switching control unit performs switching between the series mode and the parallel mode at a vehicle speed at which a maximum torque that is generable in the series mode becomes equal to a maximum torque that is generable in the parallel mode.

Preferably, an operation state switching unit is provided for switching operation states of the vehicle between a first operation mode and a second operation mode in which a consumption amount of power of the secondary battery is suppressed more than in the first operation mode, and when the operation state switching unit is in the first operation mode, the mode switching control unit performs switching between the series mode and the parallel mode at a vehicle speed at which the maximum torque that is generable in the series mode equals to the maximum torque that is generable in the parallel mode, and if the operation state switching unit is in the second operation mode, the mode switching control unit performs switching between the series mode and the parallel mode at a vehicle speed slower than the switching vehicle speed in the first operation mode.

Moreover, preferably, secondary battery remaining amount detecting unit for detecting a state of charge of the secondary battery is provided, and, when the state of charge is at a predetermined value or more, the mode switching control unit performs switching between the series mode and the parallel mode at a vehicle speed at which the maximum torque that is generable in the series mode equals to the maximum torque that is generable in the parallel mode, and when the state of charge falls to a value less than the predetermined value, the mode switching control unit lowers the vehicle speed at which the switching between the series mode and the parallel mode is performed, as the state of charge of the secondary battery obtained from a detection result of the secondary battery remaining amount detecting unit is lowered.

Advantageous Effects of Invention

According to a control device for a hybrid vehicle of the present invention, a hybrid type switching from the series mode to the parallel mode is made at a vehicle speed at which the maximum torque that can be generated in the series mode equals the maximum torque that can be generated in the parallel mode.

Therefore, the hybrid type switching is made at the vehicle speed at which the maximum torques that can be generated in the respective modes are equal, and the maximum output torque as a vehicle can be generated at any time and thus, operation performances of the vehicle can be improved.

Moreover, if the operation state switching unit is in the first operation mode, the switching between the series mode and the parallel mode is made at a vehicle speed at which the maximum torque that can be generated in the series mode equals the maximum torque that can be generated in the parallel mode, and if the operation state switching unit is in the second operation mode, the switching between the series mode and the parallel mode is made at a vehicle speed lower than the vehicle speed at which the switching between the series mode and the parallel mode is made in the first operation mode.

By setting the vehicle speed at which the series mode is switched to the parallel mode in the second operation mode lower than the vehicle speed in the first operation mode, and by switching the series mode to the parallel mode while the vehicle is traveling at a low speed, for example, a time period during which the power generator is driven by the internal combustion engine in the series mode so as to generate electric power can be shortened.

Therefore, although the energy conversion efficiency of the generator is poor, losses caused by energy conversion can be reduced and fuel efficiency of the engine can be improved, by shortening the period for driving the generator by the engine in the series mode.

Moreover, by lowering the vehicle speed at which the series mode and the parallel mode are switched to each other as the state of charge of the secondary battery lowers, the vehicle can be made to travel by power of the internal combustion engine and thus, decrease of the state of charge of the secondary battery can be moderated, and a traveling distance by using the secondary battery can be extended.

DESCRIPTION OF EMBODIMENTS

An embodiment of the present invention will be described below on the basis of the attached drawings.

Figure 1:
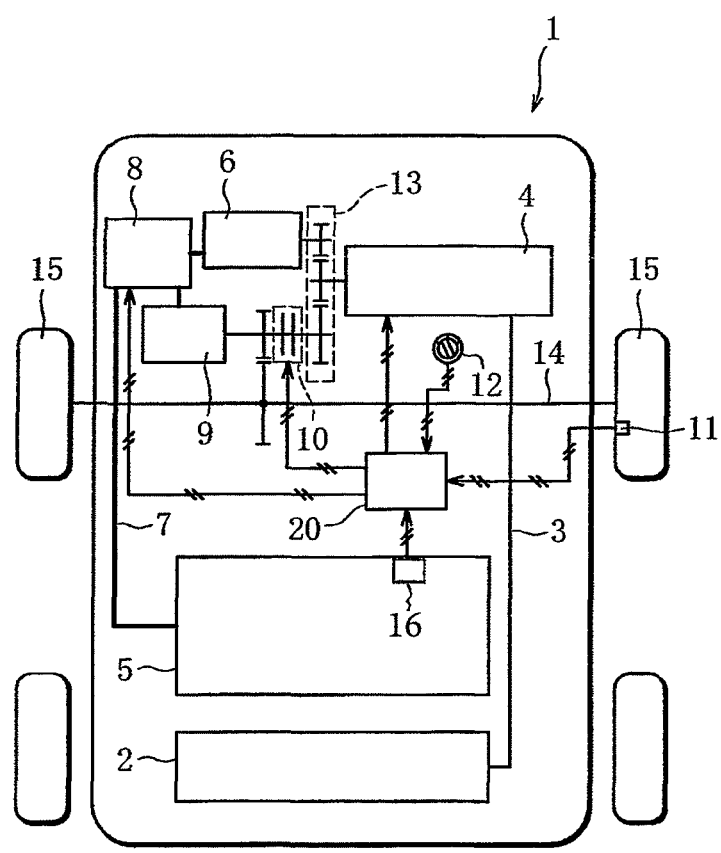
FIG. 1 is a schematic construction diagram of a vehicle on which a control device for a hybrid vehicle according to the present invention is installed.
Figure 2:
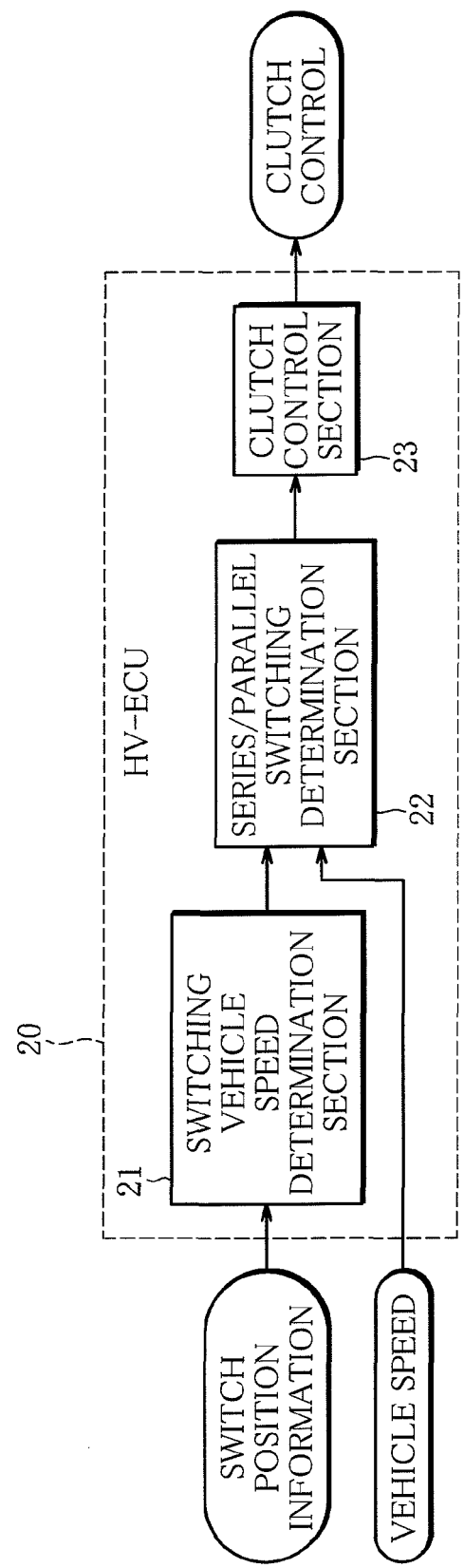
FIG. 2 is a block diagram of an ECU of the control device for the hybrid vehicle according to the present invention.

FIG. 1 is a schematic construction diagram of a vehicle on which a control device for a hybrid vehicle according to the present invention is installed. FIG. 2 is a block diagram of an HV-ECU of the control device for the hybrid vehicle according to the present invention. A configuration of the control device for the hybrid vehicle will be described below.

A vehicle 1 in which the control device for the hybrid vehicle according to the present invention is used is a hybrid automobile provided with an engine (internal combustion engine) 4 to which a fuel is supplied from a fuel tank 2 through a fuel pipe 3 and a travel motor (electric motor) 9 to which a high voltage electric power is supplied from a high voltage battery (secondary battery) 5 and a generator (power generator) 6 through a high voltage circuit 7 and whose operation is controlled by an inverter 8 as a traveling device of the vehicle 1, and the high voltage battery 5 can be charged by a charger by connecting a charging cable extending from an external power source to a charging lid (not shown).

As illustrated in FIG. 1, the control device for the hybrid vehicle according to the present invention comprises an engine 4 mounted on the vehicle 1, a high voltage battery 5, a generator 6, a travel motor 9, a clutch 10, a vehicle speed sensor 11, a traveling mode switch (operation state switching unit) 12, and an electronic control unit (mode switching control unit) 20 which, hereinafter referred to as HV-ECU, is a control device for executing overall control of the vehicle and includes an input/output device, a storage device (ROM, RAM, a non-volatile RAM and the like), a central processing unit (CPU) and the like.

The engine 4 is to generate power in accordance with an operation amount of an accelerator pedal (not shown) by the driver. The power generated by the engine 4 is transmitted to the generator 6 and a drive axle 14 driving a drive wheel 15 through the clutch 10 via a transmission 13 having a fixed change gear ratio.

The high voltage battery 5 is configured with secondary battery cells such as lithium ion battery cells or the like. Moreover, the high voltage battery 5 is configured with a battery module including a plurality of module units, where each module unit includes a plurality of battery cells and a cell monitoring unit that monitors the battery cells, and a battery monitoring unit 16 that monitors a temperature and a state of charge (hereinafter referred to as SOC) of the battery module and the like on the basis of an output from the cell monitoring units.

The generator 6 is driven by the engine 4 to generate electric power, and supplies the electric power to the high voltage battery 5 or the travel motor 9 via the inverter 8.

The inverter 8 controls electric power generation of the generator 6 and driving of the travel motor 9 on the basis of a control signal from the HV-ECU 20.

The clutch 10 is interposed between the engine 4 and the drive axle 14 and engages/disengages transmission of power of the engine 4 to the drive axle 14 on the basis of the control signal from the HV-ECU 20.

The vehicle speed sensor 11 is provided on a hub portion on an end portion of the drive axle 14 and detects a vehicle speed of the vehicle 1.

The traveling mode switch 12 is a dial type switch. The traveling mode switch 12 is operated by the driver, and the driver rotates the traveling mode switch 12 so as to switch to any traveling mode among the modes like a Normal mode (first operation mode) having an emphasis on operation performances during travel, an ECO mode (second operation mode) in which power consumption and fuel consumption during travel are suppressed, and so on. In this example, the Normal mode is referred to as the first operation mode and the ECO mode as the second operation mode, for explanation, but the first operation mode may be a Power mode and the second operation mode as the Normal mode as another example.

The HV-ECU 20 is a control device for executing control of the vehicle 1 in a comprehensive manner, and includes an input/output device, a storage device (a ROM, a RAM, a non-volatile RAM and the like), a central processing unit (CPU), a timer and so on.

To an input side of the HV-ECU 20, the battery monitoring unit 16 of the high voltage battery 5, the vehicle speed sensor 11, and the traveling mode switch 12 are connected, and detection information from these devices is inputted thereto.

On the other side, to an output side of the HV-ECU 20, the engine 4, the inverter 8, and the clutch 10 are connected.

As illustrated in FIG. 2, the HV-ECU 20 includes a switching vehicle speed determination section 21, a series/parallel modes switching determination section 22, and a clutch control section 23.

The switching vehicle speed determination section 21 judges a traveling mode requested by the driver and determines a vehicle speed at which the hybrid type series mode and the parallel mode are switched on the basis of switch position information of the traveling mode switch 12 operated by the driver.

The series/parallel modes switching determination section 22 determines switching to series mode or the parallel mode on the basis of the switching vehicle speed determined for the traveling mode that has been determined by the switching vehicle speed determination section 21 and the vehicle speed detected by the vehicle speed sensor 11.

The clutch control section 23 controls engagement/disengagement of the clutch 10 on the basis of a determination result by the series/parallel modes switching determination section 22.

The HV-ECU 20 constituted as above controls the inverter 8 and the clutch 10 on the basis of the vehicle speed detected by the vehicle speed sensor 11 and switching the hybrid modes between the series mode in which the vehicle 1 is made to travel only by power of the travel motor 9 and the parallel mode in which the vehicle 1 is made to travel by the power of the engine 4 and the travel motor 9. In more detail, in the series mode, the clutch 10 is released so as to inhibit transmitting the power to the drive axle 14 via the transmission 13 from the engine 4. Then, by controlling the inverter 8, the electric power is generated by the generator 6 with the power of the engine 4, and then the electric power generated by the generator 6 and the electric power stored in the high voltage battery 5 are supplied to the travel motor 9. Then, the power is generated by the travel motor 9, and the vehicle 1 is made to travel by the power of the travel motor 9. In the parallel mode, the inverter 8 is controlled and electric power generation by the generator 6 by the power of the engine 4 is inhibited. Then, the clutch 10 is connected so that the power can be transmitted to the drive axle 14 via the transmission 13 from the engine 4. Moreover, the electric power stored in the high voltage battery 5 is supplied to the travel motor 9. Thus, power is generated by the travel motor 9. The vehicle 1 is made to travel by the power of the engine 4 transmitted via the transmission 13 and the power generated by the travel motor.

Hybrid type switching control by the HV-ECU 20 according to the present invention constituted as above will be described below.

Figure 3:
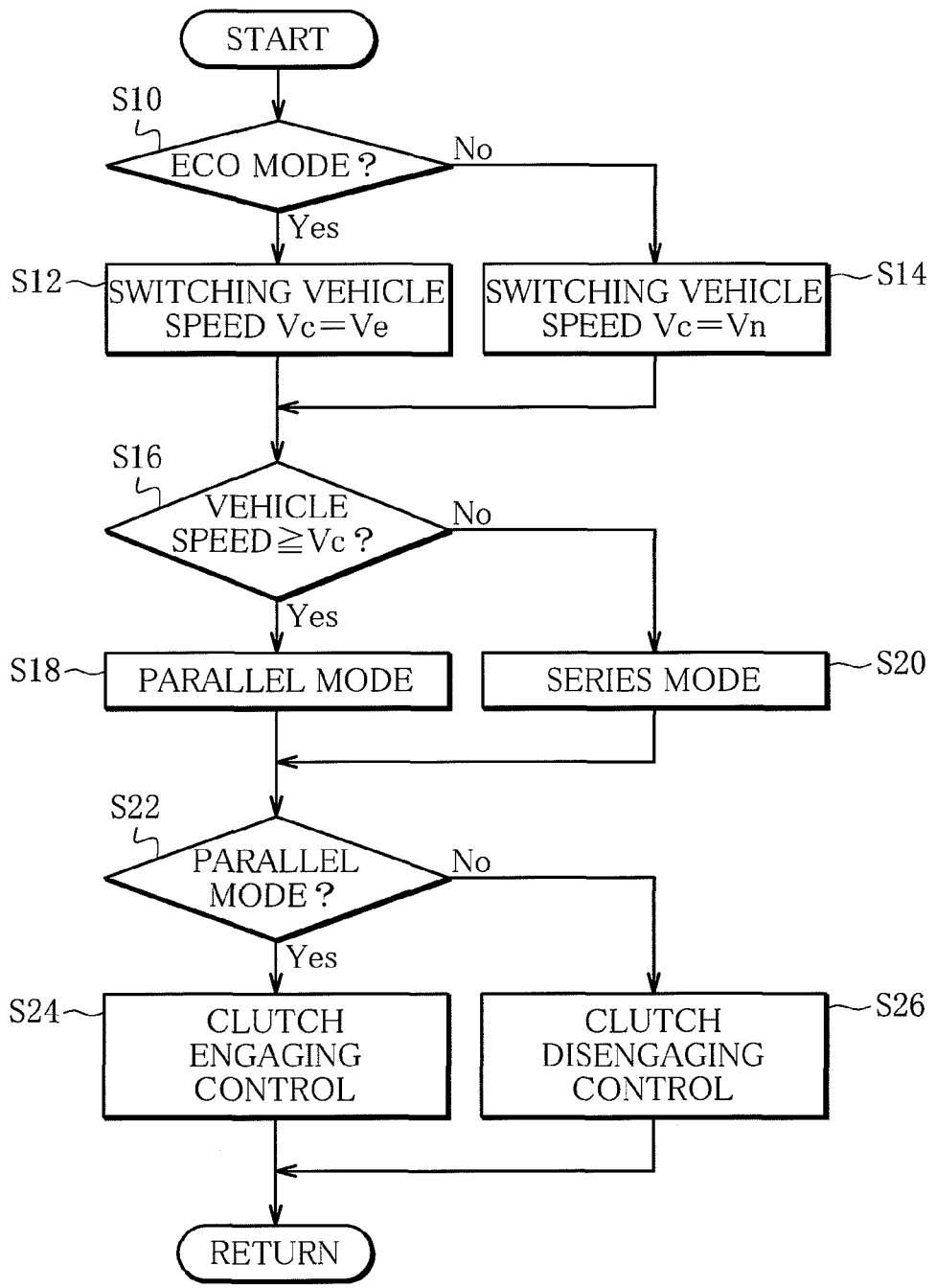
FIG. 3 is a control flowchart of switching control for a hybrid system according to the present invention.
Figure 4:
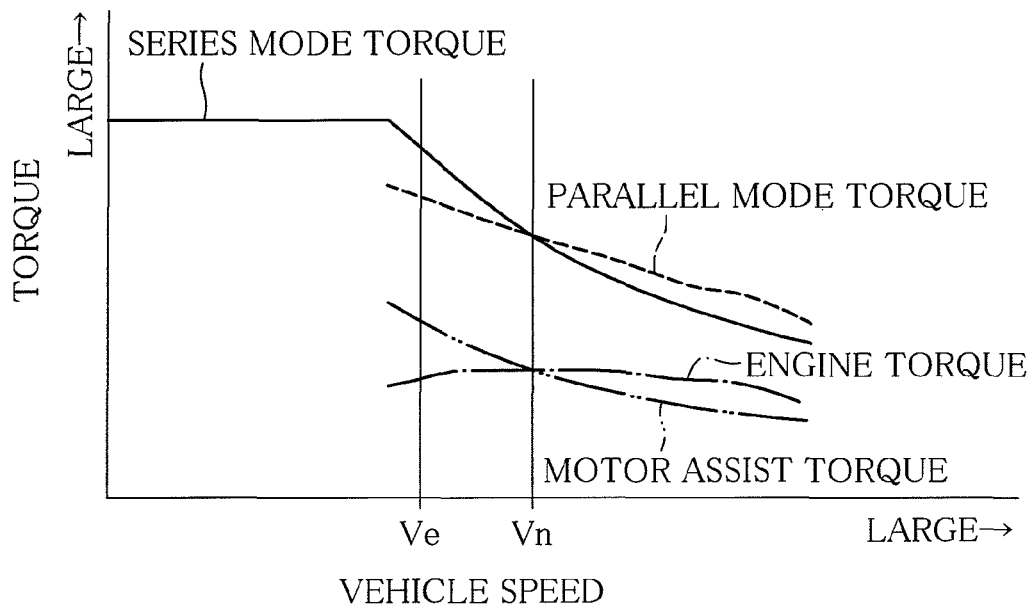
FIG. 4 illustrates a relationship between a torque and a vehicle speed in the control device for the hybrid vehicle according to the present invention.

FIG. 3 is a control flowchart of the hybrid type switching control. FIG. 4 is a graph illustrating a relationship between a torque of the control device of the hybrid vehicle and the vehicle speed, in which a solid line in the figure indicates a maximum torque that can be generated in the series mode. In more detail, the maximum torque in the series mode is the maximum torque that can be generated by the travel motor 9 by the electric power supplied from the high voltage battery 5 and the generator 6. Moreover, a dashed line in the figure indicates the maximum torque that can be generated in the parallel mode. In more detail, the maximum torque in the parallel mode is a torque obtained by summing the maximum torque that can be generated by the engine 4 indicated by a dashed-dotted line in the figure and the maximum torque that can be generated by the travel motor 9 by the electric power supplied only from the high voltage battery 5 indicated by a thin dashed-two-dotted line in the figure. A vehicle speed Vn in the figure is a vehicle speed which is in the Normal mode (first operation mode) of travelling, and at which the hybrid mode is switches from the series mode to the parallel mode. The vehicle speed Vn is determined to be a vehicle speed at which the maximum torque based on the vehicle speed in the series mode and the maximum torque based on the vehicle speed in the parallel mode become equal to each other. Moreover, a vehicle speed Ve in the figure is a vehicle speed which is in the ECO mode (second operation mode) during travelling, and at which the hybrid mode switches from the series mode to the parallel mode. The vehicle speed Ve is determined to be a vehicle speed slower than the vehicle speed Vn.

As illustrated in FIG. 3, at Step S10, it is judged whether the traveling mode is the ECO mode or not. In more detail, in the switching vehicle speed determination section 21, it is judged whether the traveling mode is the ECO mode or not, based on the switch position information of the traveling mode switch 12. If a judgement result is true (Yes), i.e. the traveling mode is the ECO mode, then it proceeds to Step S12, and the switching vehicle speed Vc is set to the vehicle speed Ve indicated in FIG. 4. Then, it proceeds to Step S16. If the judgement result is no (No), i.e. the traveling mode is the Normal mode, the switching vehicle speed Vc is set to the vehicle speed Vn as illustrated in FIG. 4. Then, it proceeds to Step S16.

At Step S16, it is determined whether or not the vehicle speed is equal to the switching vehicle speed Vc or more. In more detail, it is determined whether or not the current vehicle speed detected by the vehicle speed sensor 11 is equal to the switching vehicle speed Vc or more set at Step S12 or Step S14 in the series/parallel switching determination section 22. If the determination result is true (Yes), i.e. the current vehicle speed is the switching vehicle speed Vc or more, then it proceeds to Step S18, and the hybrid moe is set to the parallel mode. Then, it proceeds to Step S22. If the determination result is no (No), i.e. the current vehicle speed is lower than the switching vehicle speed Vc, the hybrid mode is set to the series mode. Then, it proceeds to Step S22.

At Step S22, it is judged whether the traveling mode is the parallel mode or not. In more detail, at Step S22, it is judged whether the parallel mode has been set by the clutch control section 23 or not. If the jdgement result is true (Yes), i.e. the parallel mode has been set, then it proceeds to Step S24. If the judgement result is no (No), i.e. the series mode has been set, then it proceeds to Step S26.

At Step S24, the operation is controlled so that a control signal is outputted from the clutch control section 23 to connect the clutch 10. Moreover, the inverter 8 is controlled so that electric power cannot be generated by the generator 6. Then, this operation flow is finished.

At Step S26, the operation is controlled so that the control signal is outputted from the clutch control section 23 and the clutch 10 is released. Moreover, the inverter 8 is controlled so that the electric power can be generated by the generator 6 by the power of the engine 4. Then, this operation flow is finished.

As described above, in the control device for the hybrid vehicle according to the present invention, switching of the hybrid modes from the series mode to the parallel mode is done at the vehicle speed Vn at which the maximum torque that can be generated in the series mode and the maximum torque that can be generated in the parallel mode become equal to each other.

Therefore, switching of the hybrid mode is done at the vehicle speed Vn at which the maximum torques that can be generated in the respective modes become equal to each other, and therefore a maximum output torque of a vehicle can be generated at any time, enabling operation performances of the vehicle to be improved.

Moreover, if the traveling mode is the Normal mode, the series mode and the parallel mode are switched at the vehicle speed Vn at which the maximum torque that can be generated in the series mode and the maximum torque that can be generated in the parallel mode become equal to each other, whereas if the traveling mode is the ECO mode, the series mode and the parallel mode are switched at the vehicle speed Ve which is lower than the switching vehicle speed Vn between the series mode and the parallel mode in the Normal mode.

As described above, the vehicle speed Ve of the ECO mode at which the series mode is switched to the parallel mode is set lower than the vehicle speed Vn of the Normal mode, and the series mode is switched to the parallel mode while the vehicle is traveling at a lower speed so that a time period during which the generator 6 is driven by the engine 4 in the series mode for generating electric power can be shortend.

Therefore, although the energy conversion efficiency of the generator 6 is poor, losses caused by energy conversion can be reduced and fuel efficiency of the engine 4 can be improved, by shortening the period for driving the generator 6 by the engine 4 in the series mode.

Moreover, in this embodiment, as compared with a vehicle in which the series mode and the parallel mode are switched by an accelerator operation as a torque request of the driver, the mode switching can be less frequent, and thus, a life of the clutch 10 can be extended, and moreover, torque fluctuation during mode switching can be suppressed.

Though the embodiments of the present invention have been described as above, the present invention is not limited to these embodiments.

Figure 5:
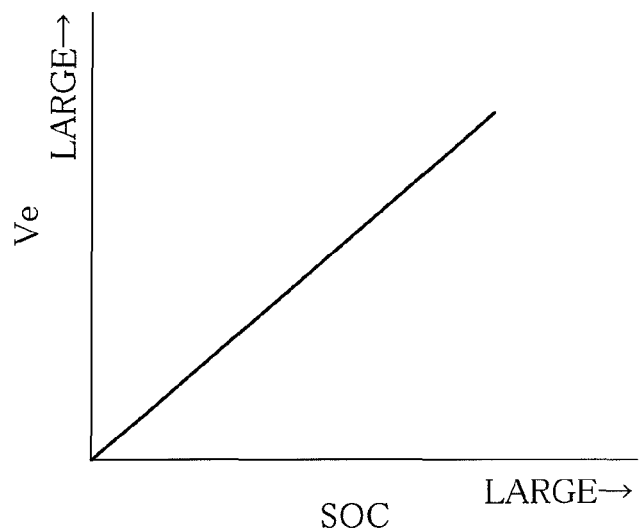
FIG. 5 illustrates a relationship between a state of charge of a high-voltage battery and a switching vehicle speed according to the present invention.

For example, in this embodiment, the vehicle speed Ve of the ECO mode at which the hybrid mode is switched is fixed, but this is not limiting, and the vehicle speed Ve may be adjusted on the basis of the SOC of the high voltage battery 5 by using a map as illustrated in FIG. 5, for example. As a result, it may be so configured that the vehicle speed Ve at which the series mode and the parallel mode are switched is lowered, as the SOC of the high voltage battery 5 lowers so that the vehicle 1 can travel by power of the engine 4 and thus, reduction of the SOC of the high voltage battery 5 can be suppressed, and a traveling distance by the high voltage battery 5 can be extended.

LIST OF REFERENCE NUMERALS 1 vehicle
4 engine (internal combustion engine)
5 high voltage battery (secondary battery)
6 generator (power generator)
9 travel motor (electric motor)
10 clutch
11 vehicle speed sensor
12 traveling mode switch (operation state switching unit)
15 drive wheel
20 HV-ECU (mode switching control unit)
21 switching vehicle speed determination section
22 series/parallel modes switching determination section
23 clutch control section

The invention claimed is:

1. A hybrid vehicle having a control device for a hybrid vehicle, the control device including a processor and a storage unit, the hybrid vehicle comprising:
   an internal combustion engine and an electric motor mounted on a vehicle;
   a drive wheel driven by at least either one of the internal combustion engine and the electric motor;
   a power generator, connected to the internal combustion engine via a transmission, for generating electric power by being driven by the internal combustion engine;
   a battery for storing electric power generated by the power generator and supplying the stored electric power to the electric motor;
   a clutch interposed between the internal combustion engine and the drive wheel and adapted to engage/disengage power transmitted from the internal combustion engine to the drive underline wheel, the internal combustion engine and the power generator being connected to one side of the clutch, and the electric motor and the driving wheel being connected to another side of the clutch;
   a vehicle speed sensor that detects a vehicle speed of the hybrid vehicle; and
   an operation state switching unit that switches, by an operation by a user, operation states of the vehicle between a first operation mode and a second operation mode in which a consumption amount of power of the battery is suppressed more than in the first operation mode,
   wherein the control device includes,
   a mode switching control unit, performed by the processor, causing the processor to switch between a series mode in which the drive wheel is driven by power generated by the electric motor by using the electric power supplied from the battery and from the power generator by disengaging the clutch and a parallel mode in which the drive wheel is driven by power of the internal combustion engine and the power generated by the electric motor by using the electric power supplied from the battery by engaging the, based on the detected vehicle speed of the hybrid vehicle, wherein
   the mode switching control unit performs switching between the series mode and the parallel mode when the detected vehicle speed is at a first vehicle speed at which a maximum torque generated only by the electric motor in the series mode becomes equal to a maximum torque generated by the electric motor and the combustion engine in the parallel, and wherein
   when the operation state switching unit is in the first operation mode, the mode switching control unit performs switching between the series mode and the parallel mode at the first vehicle speed, and when the operation state switching unit is in the second operation mode, the mode switching control unit performs switching between the series mode and the parallel mode at a second speed lower than the first speed, and the mode switching control unit prohibits the power generator from generating the electric power in the parallel mode.

2. The hybrid vehicle according to claim 1, further comprising:

monitoring a state of charge of the battery, wherein when the state of charge is at a predetermined value or more, the mode switching control unit performs switching between the series mode and the parallel mode at the first speed, and, when the monitored state of charge falls to a value less than the predetermined value, the mode switching control unit lowers the vehicle speed at which the switching between the series mode and the parallel mode is performed, as the monitored state of charge of the battery reduces.

* * * * *